UNITED STATES PATENT OFFICE.

WILLIAM SPEARS, OF JAMESTOWN, NEW YORK.

IMPROVEMENT IN THE MANUFACTURE OF HYDROCARBON OILS.

Specification forming part of Letters Patent No. 107,734, dated September 27, 1870.

*To all whom it may concern:*

Be it known that I, WILLIAM SPEARS, of Jamestown, in the county of Chautauqua and State of New York, have invented a new and useful Improvement in the Manufacture of Hydrocarbon Oil; and I do hereby declare that the following is a full, clear, and exact description thereof, which will enable others skilled in the art to make and use the same.

The object of this invention is to produce a highly valuable hydrocarbon oil or liquid for illuminating or other purposes from the products of distillation in the process of manufacturing oils from crude petroleum; and consists in uniting (by the application of heat) the first and most volatile product of distillation (benzine) with the refuse tar, thereby forming a compound from which a highly valuable oil is distilled.

In carrying out my invention and discovery I place the benzine and the tar (in suitable proportions) in a tank or vat of proper capacity, and raise the temperature of the mixture sufficiently high to cause the two substances to perfectly unite.

The temperature may be raised by means of steam, or by heat applied in any other manner.

By the application of heat the dirt and clay or other foreign matter contained in the tar is precipitated, and the compound may be distilled most successfully, the yield of oil being much greater than from common crude petroleum.

The specimen marked C is the benzine and tar combined according to my invention. D is the oil distilled therefrom.

Having thus described my invention, I claim as new and desire to secure by Letters Patent—

An illuminating-oil manufactured by distilling a chemical combination formed of benzine and tar, in the manner specified.

WILLIAM SPEARS.

Witnesses:
 JESSE M. HEALY,
 JAMES M. YOONY.